United States Patent [19]

Pivot et al.

[11] Patent Number: 4,911,143
[45] Date of Patent: Mar. 27, 1990

[54] HEATING APPLIANCE WITH A CATALYTIC BURNER

[75] Inventors: Jean-Claude Pivot, Vourles; Philippe Bottazzi, Sainte Foy Les Lyon, both of France

[73] Assignee: Application des Gaz, Paris, France

[21] Appl. No.: 257,747

[22] Filed: Oct. 14, 1988

[30] Foreign Application Priority Data

Oct. 20, 1987 [FR] France ............................ 87 14747

[51] Int. Cl.$^4$ ............................................. B23K 3/02
[52] U.S. Cl. .................................. 126/414; 126/413
[58] Field of Search ............... 126/413, 414, 238, 228, 126/229, 234, 239, 408, 409; 431/329, 328, 255; 222/2, 3; 228/51

[56] References Cited

U.S. PATENT DOCUMENTS

| | | | |
|---|---|---|---|
| 4,119,088 | 10/1978 | Sim | 126/413 |
| 4,133,301 | 1/1979 | Fujiwara | 126/413 |
| 4,552,124 | 11/1985 | Nakajima | 126/413 |
| 4,648,380 | 3/1987 | Nakajima | 126/414 |
| 4,688,551 | 8/1987 | Nakajima | 126/414 |
| 4,785,793 | 11/1988 | Oglesby et al. | 126/414 |

FOREIGN PATENT DOCUMENTS 2407423  6/1980  France .
2559694  8/1985  France .

*Primary Examiner*—James C. Yeung
*Attorney, Agent, or Firm*—Oliff & Berridge

[57] ABSTRACT

In a heating appliance with an induced-air catalytic burner, the catalytic burner comprises a refractory core having extending right through it axial conduits for the circulation of the combustible mixture, and dynamic braking means are provided in relation to the core, to make it possible to obtain at the outlet of the burner a speed profile making it possible to prime the ignition of the catalytic burner. A downstream flame heats the core until the catalytic burner is activated, at which moment the downstream flame disappears automatically.

The invention applies to all types of heating appliance of the portable type, whatever their uses.

11 Claims, 3 Drawing Sheets

HEATING APPLIANCE WITH A CATALYTIC BURNER

TECHNICAL FIELD

The present invention relates to a heating appliance with a catalytic burner, which functions with a compressed fuel gas and only induced primary air, without secondary ventilation of the catalyst.

BACKGROUND OF THE INVENTION

The patent No. FR-A-No. 2,559,694 described a heating appliance of the type defined above, more specifically a portable soldering iron, incorporating a rechargeable reservoir for the fuel gas, for example butane. Such an appliance comprises, in the direction of circulation of the fuel gas:

a double member for controlling the gas stream coming from the rechargeable reservoir, composed, on the one hand, of a valve controlled in terms of opening or closing by a suitable mechanism and, on the other hand, of a member for adjusting the gas flow leaving the valve when the latter is open;

an injector ejecting a gas jet from the gas stream coming from the double control member;

a means for driving primary air by means of the gas jet, to form a combustible mixture circulating in a pipe;

a naked-flame burner located at the end of the preceding pipe and having a member for the retention of the said flame;

a junction tube connecting the outlet of the naked-flame burner to the inlet of the catalytic burner, having orifices both for the passage of the secondary air necessary for the naked flame and for igniting the flame burner; these orifices are associated with a shutter flap movable in translational motion and controlled by the user;

an actual catalytic burner comprising a refractory, that is to say heat-resistant, core through which extends in the direction of the combustible mixture, from its inlet face to its outlet face, a plurality of conduits, the inner surface of which is covered with a suitable combustion catalyst; and a cap equipped with burnt-gas discharge ports and closing the outlet of the catalytic burner; this metal cap is in a heat-exchange relationship with the burner and, because of a suitable shape, serves as a soldering bit.

Such an appliance is ignited in the following way.

By actuating the gas-flow adjustment member and, separately, the control of the valve, the naked-flame burner is supplied with a mixture rich in fuel gas.

By opening the flap shutting off the orifices in the junction tube, on the one hand the ignition of the naked-flame burner is assisted by the intake of secondary air, and on the other hand, the same burner can be ignited, for example, by the flame of a lighter introduced into one of these orifices.

The inlet face of the refractory core of the catalytic burner is heated by the end of the naked flame.

When the refractory core is at the desired temperature, the user commands the closing of the orifices in the junction tube by means of the shutter flap. The naked-flame burner is thus extinguished, and the mixture feeding the latter circulates from the outlet of the naked-flame burner to the inlet of the catalytic burner via the junction tube.

Because the refractory core is at the working temperature of the catalytic material, the catalytic burner comes into operation. The combustion smoke and the thermal contact of the metal cap with the catalytic burner heat the bit, which is then ready for use.

Such a method of ignition has various serious disadvantages.

First of all, the presence of a naked-flame burner in the path of the fuel gas from the injector towards the catalytic burner makes the construction of the appliance especially complex.

Subsequently, the system with a shutter flap for the junction tube can lead to various incorrect operations.

The user may not be able to open this flap and may attempt ignition at the ports for discharging the burnt gases in the cap. He will not succeed, but the combustible mixture will nevertheless continue to escape from the appliance.

The user may close this shutter again too soon, at a moment when the catalytic burner is not sufficiently hot to ignite; or he will have to start the operation again, or he will be unaware of the malfunction, but the combustible mixture will still be escaping.

The shutter may remain open without the user's knowledge or under his control. In this case the flame burner will remain in operation, without thereby igniting the catalytic burner, the entire combustible mixture being burnt in the region of the flame burner. In this case, on the one hand, the catalyst may be permanently damaged because of the overheating to which it is subjected and, on the other hand, the flames escaping through the orifices in the junction tube can heat in a damaging manner the components on which work is being carried out, for example an electronic circuit.

SUMMARY OF THE INVENTION

The subject of the present invention is a heating appliance, such as that defined above, which can be ignited by the user in a simple way and without incorrect operation.

According to the present invention, in combination:

the inlet of the catalytic burner communicates directly with the outlet of the injector by means of a junction tube continuous and sealed, except in the region of the injector, where the primary-air drive means is located;

dynamic braking means are associated with the catalytic burner to obtain at the outlet of the latter, in an axial plane passing through the outlet direction of the refractory core, a differentiated speed profile having at least one trough in the vicinity of the outlet face of the same refractory core.

BRIEF DESCRIPTION OF THE DRAWINGS

The present invention will be described with reference to the accompanying drawings in which.

DETAILED DESCRIPTION OF PREFERRED EMBODIMENTS

Figure 1:
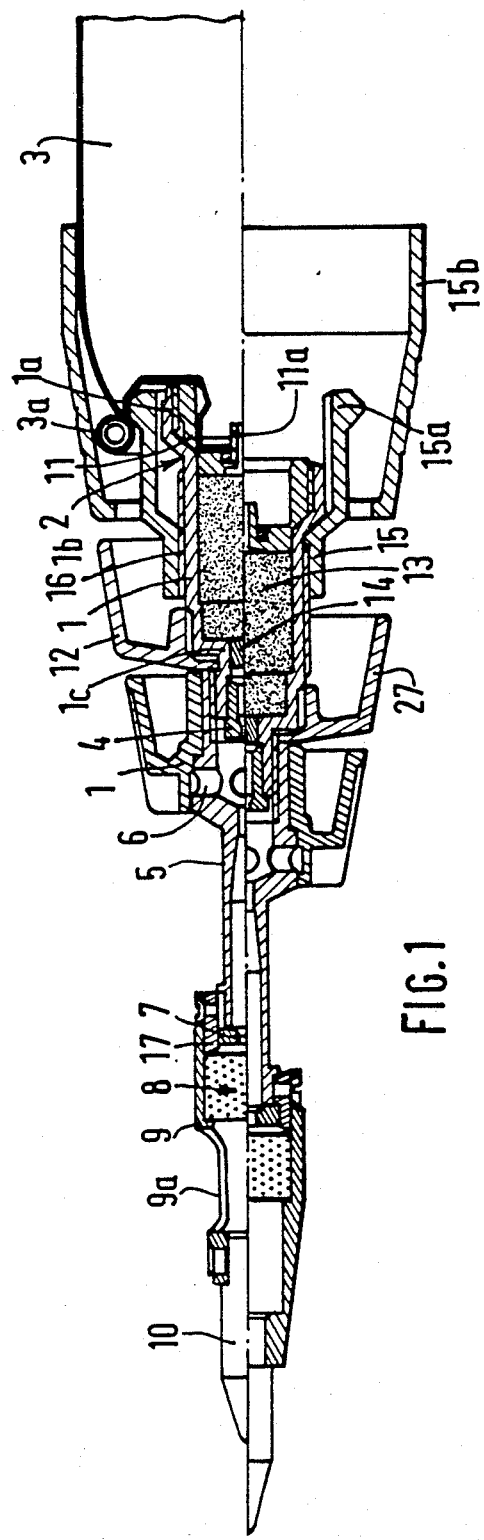
FIG. 1 shows a view in axial section through a heating appliance according to the present invention, the upper part of this Figure showing the appliance coupled to a cartridge of a compressed fuel gas, for example butane, and the lower part showing the same appliance uncoupled from the cartridge.
Figure 2:
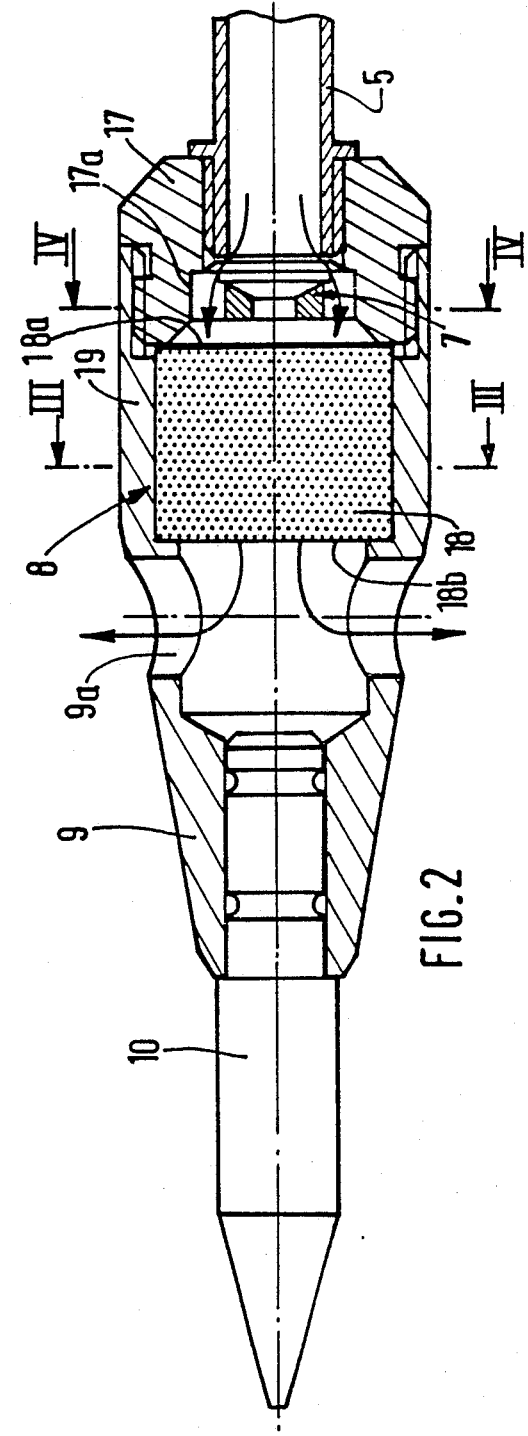
FIG. 2 shows, on an enlarged scale and in axial section, the catalytic burner forming part of the appliance illustrated in FIG. 1.
Figure 3:
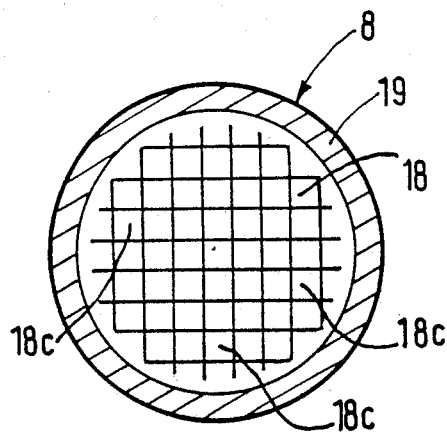
FIG. 3 shows a sectional view of the catalytic burner along the Line III—III of FIG. 2.

As the following description will state specifically, the technical means characterizing the present invention function in the following way at the moment of ignition of the catalytic burner.

As any person skilled in the art of combustion knows, the existence of a stable flame presupposes equality between the linear speed of circulation of the gaseous combustible mixture and the speed of propagation of the same flame in the opposite direction. Also, the design of a flame burner involves, in particular, localizing at the outlet of the burner the surface where the above-mentioned equality will be maintained. If this equality is no longer maintained at the outlet of the burner, the following phenomena, well known to the same person skilled in the art, then occur:

if the combustion speed exceeds the speed of circulation of the mixture, the flame penetrates inside the burner and can cause internal combustion at the injector which is detrimental to the appliance;

if the speed of circulation of the mixture exceeds the combustion speed, the flame brakes away from the burner, thus giving rise to an unstable flame capable of being extinguished; the ignition or re-ignition of the burner is then especially difficult, or even impossible.

If the catalytic burner according to the invention is considered at the moment of ignition, the combustible mixture leaves the refractory core via the various conduits. The existence of a speed trough in the vicinity of the outlet surface of the same refractory core makes it possible to localize at the outlet of the catalytic burner a limited or spot-like surface which is located at the mouth of the conduits opposite the speed trough and where, after ignition, the corresponding flame front is in thermal contact with the outlet of the catalyst. Without the dynamic braking means according to the invention, such a flame front can exist, but it is at a distance from the outlet of the catalytic burner, and this does not allow a rapid rise in temperature of the latter.

Consequently, on the preceding limited or spot-like surface, it is possible to retain a flame in thermal contact with the refractory core.

This flame progressively heats the refractory core until it reaches the temperature for the activation of the catalytic material. From that moment, the combustion of the fuel/primary-air mixture will occur inside the refractory core, all the available fuel being consumed. From then, the ignition flame will be extinguished and the catalytic burner will function; without outside intervention, the downstream ignition flame as it were re-enters the catalytic burner which then takes over the combustion of the mixture.

It is therefore an ignition procedure which is extremely simple and the sequencing of which is virtually automatic and, at all events, requires no intervention by the user beyond the initial ignition at the outlet of the catalytic burner.

Also, this simple procedure does not cause any complication, on the contrary, in the construction of a heating appliance according to the invention.

Furthermore, during operation, since all the fuel is consumed by the catalytic burner it is no longer possible for a permanent flame to exist on the appliance, especially downstream of the catalytic burner. This contributes to the user's safety.

The invention, applied to a soldering iron, affords another advantage, because the priming temperature of the catalytic burner corresponds substantially to the working temperature of the bit. Consequently, as soon as the downstream flame is extinguished, the user is certain that the soldering bit has reached its working or soldering temperature.

According to FIGS. 1 to 5, a heating appliance according to the present invention, consisting of a portable soldering iron, comprises the following main elements or members:

a body (1);

a means (2) for coupling the body (1) to a cartridge (3) of compressed fuel gas, for example butane, equipped with an extraction valve (not shown); this coupling means makes it possible in a reversible way, on the one hand, to fix the body (1) of the appliance to the cartridge (3) and, on the other hand, to open the valve of the latter, with sealing relative to the outside between the open valve and the body (1); as mentioned below, the coupling means (2) serves at the same time as a member for controlling the gas stream coming out of the cartridge (3);

an injector (4) ejecting a gas jet from the stream of fuel gas circulating in the body (1);

a junction tube (5) continuous and sealed, except in the region of the injector (4), where a means (6) for driving primary air is located; from there, a combustible mixture flows in the tube (5) during operation and is composed of the compressed fuel gas and the induced air;

means (7) for the dynamic braking of the combustible mixture, which are arranged and associated upstream of the catalytic burner (8) defined below; these means are arranged at the downstream end of the junction tube (5);

the actual catalytic burner (8), the inlet of which communicates directly with the outlet of the injector (4) via the junction tube (5);

a metal cap (9) equipped with burnt-gas discharge ports (9a) and closing the outlet of the catalytic burner (8);

a soldering bit (10) fixed to and mounted on the metal cap (9).

All the preceding elements and members have been introduced in succession according to the direction of circulation of the fuel gas from the cartridge (3). The body (1) possesses a hollow form, having a symmetry of revolution relative to the axis and various sections of diameters decreasing from the upstream end towards the downstream end, in the direction of circulation of the fuel gas.

Screwed into a first section (1a) of large diameter is a plug (11) which, towards the outside, has a stud (11a) for opening the valve of the cartridge (3) and for extracting gas from the latter. A second section (1b) of smaller diameter is externally threaded. An actuating collar (12) is mounted fixedly in terms of rotation on the last section (1c) of even smaller diameter; the injector (4) is mounted by screwing onto this section (1c).

Arranged in the inner volume delimited by the wall of the body (1) and the plug (11) are an activated charcoal filter (13) for trapping the impurities of the fuel gas which are liable to block the injector (4) or disrupt the function of the catalytic burner and a filter (14) generating a pressure loss limiting the flow in the injector.

The means (2) for coupling the appliance to the cartridge (3) conforms to that described and claimed in the French patent application published under number 2,407,423 in the name of the present applicant.

A threaded ring (15) is mounted unremovably on the outside of the section (1b) of the body (1) and has teeth (15a) capable of snapping under an annular bead (3a) of the cartridge (3), located in the region of the valve of the latter. This ring (15) is fixed to a protective guard (15b) covering the upper part of the cartridge (3) when the latter is coupled to the appliance. By means of the actuating collar (12), the body (1) can be unscrewed relative to the ring (15) until the section (1a) comes up against the same ring. From that moment, since the teeth (15a) are movable radially towards the axis of the appliance, they can be snapped under the annular bead (3a) of the cartridge (3). When the body (1) is re-screwed, again by means of the actuating collar (12), the section (1a) of the body (1) consequently descends in the region of the teeth (15a) at the rear of these; this fixes the ring (15) to the bead (3a) of the cartridge (3), since the teeth (15a) are blocked against the bead (3a) by the section (1a), without the possibility of elastic retraction towards the axis of the appliance.

The junction tube (5) is screwed onto the section (1c) of the body (1). Its inner profile is relatively wide in the region of the radial orifices (6) for the intake of primary air, is narrowed downstream of these and then widens again toward the outlet of the tube (5). As a result of a Venturi effect, this inner profile makes it possible to induce and drive primary air via the orifaces (6) and mix it with the jet of fuel gas ejected from the injector (4).

With the exception of the orifices (6), this junction tube (5) is completely continuous and sealed relative to the outside. A setting ring (27) is mounted movably in terms of rotation on the lower part of the tube (5) and makes it possible partially to shut off the primary-air drive orifices (6), particularly at the moment of ignition of the appliance, as described below.

A connection (17) is arranged at the downstream end of the junction tube (5), for example by screwing. The dynamic braking means (7) is arranged axially in a transverse receptacle (17a) provided in the connection (17). This means (7) comprises a washer-shaped baffle arranged transversally relative to the axis of the appliance, opposite the inlet face (18a) of the refractory core (18) which will be discussed below.

Figure 4:
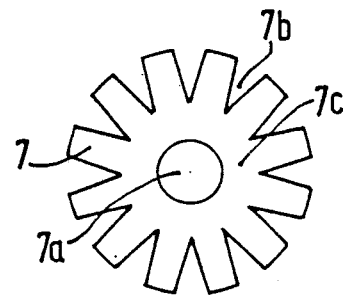
FIG. 4 shows a view on an enlarged scale, in a section along the Line IV—IV of FIG. 2, of the dynamic braking means of the catalytic burner illustrated in FIG. 2.

According to FIG. 4, this washer comprises a perforated central or axial part (7a), a plurality of peripheral cut-outs (7b), each having a V-shaped profile, and a solid part (7c) between the central perforation (7a) and the cut-outs (7c). If the solid parts present between the cut-outs (7b) are ignored, the solid part (7c) can be likened to a crown.

The catalytic burner (8) is delimited by a wall (19) having a form of revolution about the axis of the appliance, screwed to the connection (17) on one side and forming the above-defined cap (9) on the other side.

The wall (19) together with the connection (17) form a receptacle for the core (18) made of refractory material, for example ceramic, having a honeycomb structure. Consequently, the core (18) has extending through it in the direction of the combustible mixture, from its inlet face (18a) to its outlet face (18b), a plurality of conduits (18c), the inner surface of which is covered with a combustion catalyst.

The cap (9) is integral with the wall (19) of the catalytic burner (8), and the combustion gases are discharged via the ports (9a). This cap therefore closes the outlet (18b) of the catalytic burner. The soldering bit (10) is mounted by being fitted into an axial orifice in the cap (9).

A device or appliance such as that described above functions as follows.

First of all, a cartridge (3) is coupled to the appliance in conformity with the preceding description, that is to say by unscrewing the body (1) relative to the ring (15) and then re-screwing these two elements relative to one another. From then, the valve of the cartridge (3) is opened and a sealed path is made between the interior of the cartridge, via the open valve and the interior of the body (1). There is no other member for adjusting the gas stream coming from the cartridge (3), the functioning of the appliance being all or nothing; the coupling to the cartridge establishes the circulation of a gas stream towards the catalytic burner (8), and conversely uncoupling interrupts this circulation, the valve of the cartridge serving as a shutter for opening and closing the appliance/cartridge assembly.

Once the cartridge has been coupled to the appliance, the gas set coming from the injector (4) drives the induced air via the orifices (6), to form a homogeneous combustible mixture circulating through the tube (5) towards the braking means (7) and the catalytic burner (8).

Figure 5:
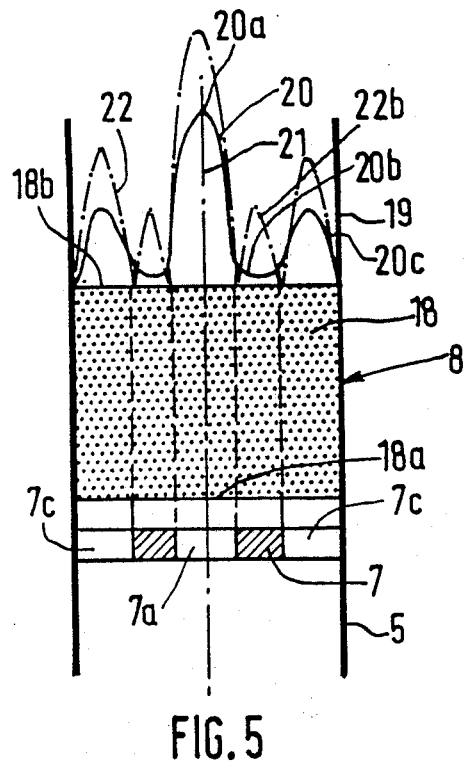
FIG. 5 is a schematic representation of the catalytic burner according to FIGS. 1 to 4, explaining the principle of operation and ignition of the same burner.

The combustible mixture, by passing through the baffle (7), is divided into a plurality of peripheral streams corresponding to the cut-outs (7b) and an axial stream corresponding to the central perforation (7a). Behind the crown (7b), an annular stream having an average speed much lower than the streams (7a) and (7c) is obtained. Downstream of the baffle (7), the speed of circulation of the various gas streams defined above is not substantially modified by passage through the various conduits (18c) of the core (18), the pressure losses in the axis of the appliance being essentially identical within the core (18). Consequently, at the outlet (18b) of the refractory core (18), the speed profile (20) represented by unbroken lines in FIG. 5 is obtained.

This profile (20) is differentiated in that the form of the speed profile (20) is not the same, depending on the distance from the axis (21) of the appliance. More specifically, according to FIG. 5, this profile (20) has from the axis (21) toward the outside of the burner (18) an axial peak (20a), a trough (20b) distributed in a crown at a distance from the outlet axis (21) of the burner (8), and finally another (20c) of less height than the peak (20a) and likewise distributed annularly relative to the axis (21). The speed trough (20b) defined above therefore corresponds to the solid part (7c) of the baffle (7). As shown in FIG. 5, this trough (20b) is located in the vicinity of or on the outlet face (18b) of the refractory core (18).

According to FIGS. 1 to 5, the speed profile according to the unbroken line (20) is obtained by arranging dynamic braking means (7) upstream of the refractory core (18), in the direction of circulation of the fuel gas. An identical or comparable profile can be obtained by other means and in a different way:

first of all, the dynamic braking means can be arranged downstream of the refractory core (18), in the direction of circulation of the fuel gas, for example in the form of an obstacle opposite the mouth of one or more conduits (18c) of the core (18);

the conduits (18c) of the refractory core (18) can also be differentiated according to their pressure loss, at least one conduit (18c) having a relatively high pressure loss to correspond to the speed trough (20b) of the outlet profile (20).

At the moment of ignition, because of the profile of the outlet speeds of the combustible mixture, at the outlet of the catalytic burner (8) it is possible to ignite a flame (22) represented by unbroken lines separated by dots in FIG. 5 and of a profile similar to the speed profile. The annular part (22b) of the flame (22) is retained on or in the vicinity of the outlet face (18b) of the refractory core.

Theoretical considerations described in the introduction to the description make it possible to understand why this annular flame exists.

As soon as this flame (22) appears, the refractory body (18) heats up until it reaches a temperature for the operation of the combustion catalyst. As soon as this temperature is reached, this generally resulting in a reddening of the core (18), the gaseous mixture is burnt without a flame within the catalytic burner (8), in such a way that the flame (22) is extinguished, the user having the impression that this flame (22) re-enters the catalytic burner (8). From that moment, the cap (9), together with the bit (10), is then brought to a suitable working temperature, thus enabling the user to work with the appliance.

Figure 6:
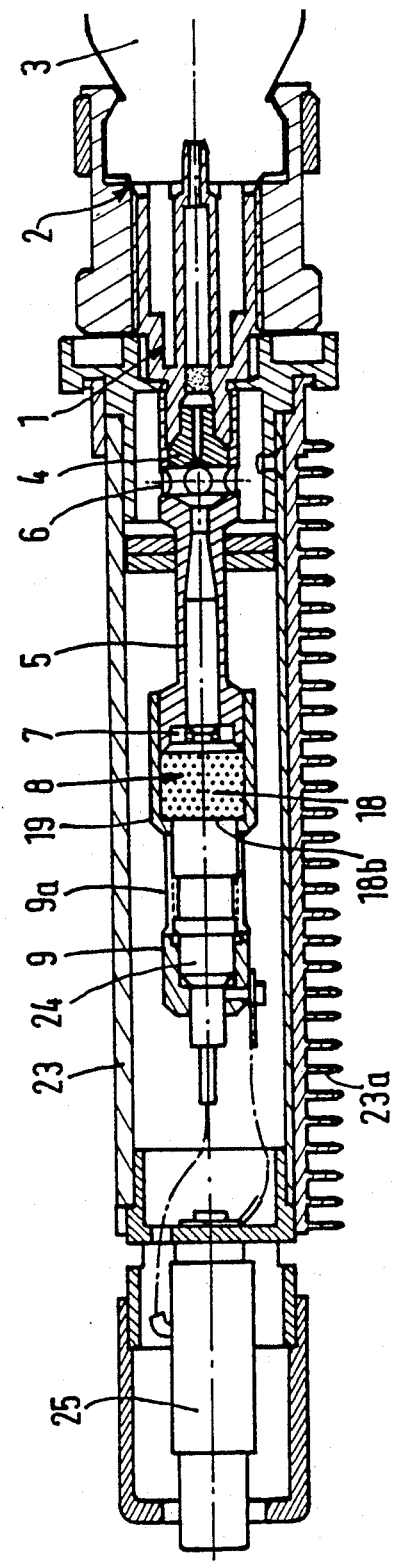
FIG. 6 shows schematically, in axial section, another heating appliance according to the present invention serving as a hair-curling iron.

According to FIG. 6, the same catalytic burner is used within another heating appliance, namely a hair-curling iron, which comprises a casing (23) with elements (23a) forming a comb. The reference numerals introduced above and repeated in FIG. 6 denote elements or members which are identical or which have the same functions as those defined above.

This appliance differs from the preceding appliance not only in its different use, but also in the following points:

a grid is arranged in the orifice of the perforations (9a);

an ignition electrode (24) is arranged inside the cap (9) opposite the outlet (18b) of the catalytic burner (8); this spark-plug is activated by a piezoelectric mechanism (25) already present on the appliance;

the catalytic burner (8) is arranged co-axially at the center of the outer casing (23), in such a way that the latter is licked by the combustion gases.

The present invention can be used on all types of heating appliances, especially those which have to be moved frequently and from which mention may be made of:

some domestic appliances, such as a toaster, a coffeemaker, a smoothing iron, etc;

appliances intended for the bathroom, such as a hair-curling iron, a hair-dryer, a hair remover, etc;

and various do-it-yourself appliances, such as the above-described soldering iron, a glue gun, a hot-air gun, etc.

What is claimed:

1. A heating appliance comprising:
fuel supply means;
a catalytic burner having a refractory core, said refractory core comprising an inlet face at an upstream side of said refractory core, an outlet face at a downstream side of said refractory core, a plurality of conduits extending from said inlet face to said outlet face, and a catalyst disposed on an inner surface of said conduits;
means for directing a combustible gas mixture comprising fuel gas from said fuel supply means to said inlet face of said core and through said conduits; and
dynamic braking means for producing a differentiated speed profile of said combustible gas mixture in an axial plane bisecting said outlet face, said differentiated speed profile including at least one trough in a vicinity of said outlet face.

2. An appliance as claimed in claim 1, wherein said fuel supply means comprises injector means for ejecting a fuel gas jet through an injector outlet; and said appliance further comprises a junction tube between said injector outlet and said inlet face of said core, said junction tube comprising means for driving primary air into admixture with said gas jet to form said combustible mixture and being continuous and sealed except in a region where said primary air driving means is located.

3. An appliance as claimed in claim 1, wherein said dynamic braking means comprises a baffle arranged in a transverse plane in a vicinity of said inlet face of said refractory core, said baffle comprising a solid part corresponding to said trough of the speed profile and a perforated part for passage of the combustible gas mixture towards the catalytic burner.

4. An appliance as claimed in claim 1, wherein the dynamic braking means is arranged in a vicinity of said outlet face of said refractory core.

5. An appliance as claimed in claim 1, wherein the dynamic braking means comprises said conduits of said refractory core, said conduits being differentiated according to pressure loss, at least one said conduit having a relatively high pressure loss and corresponding to said speed trough of said speed profile.

6. An appliance as claimed in claim 1, wherein said speed trough of said speed profile is distributed in a ring radially spaced from an axis of said catalytic burner.

7. An appliance as claimed in claim 1, wherein said catalytic burner has an outlet, and a cap equipped with burnt-gas discharge ports closes said outlet of said catalytic burner.

8. An appliance as claimed in claim 7, wherein an ignition device is arranged inside said cap opposite said outlet of said catalytic burner.

9. An appliance as claimed in claim 1, wherein said appliance further comprises a heating bit in thermal communication with said catalytic burner.

10. An appliance as claimed in claim 9, wherein said heating bit is a soldering tip.

11. An appliance as claimed in claim 10, wherein said catalytic burner is arranged at a center of an outer casing which is contacted by combustion gases.

* * * * *